INVENTORS.
EUGENE A. VOSIKA
GUNTHER SCHAAF
BY
Meyers & Peterson
ATTORNEYS

INVENTORS.
EUGENE A. VOSIKA
BY GUNTHER SCHAAF
Meyers & Peterson
ATTORNEYS

INVENTORS.
EUGENE A. VOSIKA
GUNTHER SCHAAF
BY Meyers & Peterson
ATTORNEYS

INVENTORS.
EUGENE A. VOSIKA
GUNTHER SCHAAF
BY
Meyers & Peterson
ATTORNEYS 3,307,670

APPARATUS FOR HANDLING MAGNETIC CORES HAVING AN ASYMMETRICALLY LOCATED CENTER OF GRAVITY

Eugene A. Vosika, New Brighton, and Gunther Schaaf, Minneapolis, Minn., assignors to Ramsey Engineering Company, St. Paul, Minn., a corporation of Minnesota Filed Aug. 18, 1965, Ser. No. 480,620
8 Claims. (Cl. 193—43)

This invention relates generally to apparatus for handling magnetic cores, and pertains more particularly to apparatus for orienting and testing magnetic cores having an asymmetrically located center of gravity.

Ferrite cores are utilized quite extensively in the memories of high-speed electronic computers. While many such cores are in the form of small toroids, more recent core innovations have resulted in various elongated cores having one or more holes therein. One such type of core is a multi-apertured core that is rounded at both ends but with one end being larger than the other so that it results in a core that is heavier at one end than the other.

One object of the present invention is to provide a core handler that will process magnetic cores having one end heavier than the other by first orienting the individual cores in an end-to-end relationship and then removing those cores that are reversely oriented with respect to the particular orientation that is desired during the magnetic testing thereof. More specifically, the present invention has for an aim the gravitational removal of the cores that are improperly oriented, this being achieved via at least one irregularly configured opening which allows the cores with the heavier end portions foremost to drop through such opening. Actually, it is within the contemplation of the invention to use several openings that serve as traps for the gravitational disposal of the improperly oriented cores in order to minimize the chances of a core arriving at the testing station that is reversely oriented. In this regard, the invention recognizes the possibility, although somewhat remote, that frictional forces between adjacent cores might result in the passage of an improperly oriented core across the opening that is intended to trap and remove such a core.

Another object of the invention is to provide a mechanism for holding cores having a center of gravity asymmetrically located along their respective longitudinal axes so that the magnetic testing thereof can be effected. Although it is exceedingly remote that an improperly oriented core of the type envisaged would arrive at the testing station, nonetheless the holding mechanism assures that there will be no jamming or obstruction presented to the probe assembly as it comes into its testing position relative to the core being held.

A further object of the invention is to provide a core handler of the foregoing character that will be of simple construction and which can be operated at a very high speed. In this regard, since the testing operation must be performed at a relatively high rate, usually above 100 times per minute, it is most desirable to provide a supply of the cores to the testing station in a rapid sequence and at the same time have the cores properly located so that the reciprocating test probes carried by the probe assembly will enter each core through the appropriate holes formed in such core. The faster a core handling mechanism can operate, the more economical it proves to be.

Yet another object of the invention is to provide handling apparatus for magnetic cores that will assure that the probes on the probe assembly will not be damaged.

Quite briefly, the invention comprises the means for first directing a sequence of magnetic cores having an asymmetrically located center of gravity along their longitudinal axes so that the cores are arranged in an end-to-end relationship. When so arranged, even though possibly an equal number will be reversely oriented, provision is then made for gravitationally ridding the stream of cores of those that are reversely turned with respect to those that are properly oriented. To do this, the cores are advanced in the direction of at least one opening having a tongue extending from the approach edge thereof so that the cores with the heavier end portions foremost are rocked about the approach edge and then returned to the supply of such cores for another pass over the one or more irregularly configured openings. Consequently, the cores will ultimately pass over the trap opening (or openings) in the properly oriented direction. Still further, the invention provides a pair of arms that are appropriately notched so as to form a pocket which receives each of the properly oriented cores and holds each core so that the probes on the probe assembly can be inserted into the holes of the particular core being tested. When the arms separate, the core after being tested is permitted to drop downwardly into an appropriate receptacle, being directed into either an "accept" or "reject" receptacle as the case may be.

These and other objects and advantages of my invention will more fully appear from the following description, made in connection with the accompanying drawings, wherein like reference characters refer to the same or similar parts throughout the several views and in which.

Figure 2:
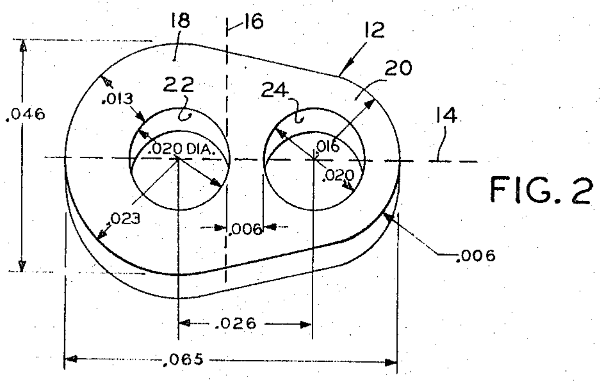
FIGURE 2 is a perspective view of a multi-apertured individual core which is typical of those the apparatus is capable of handling.
Figures 5, 13, 14:
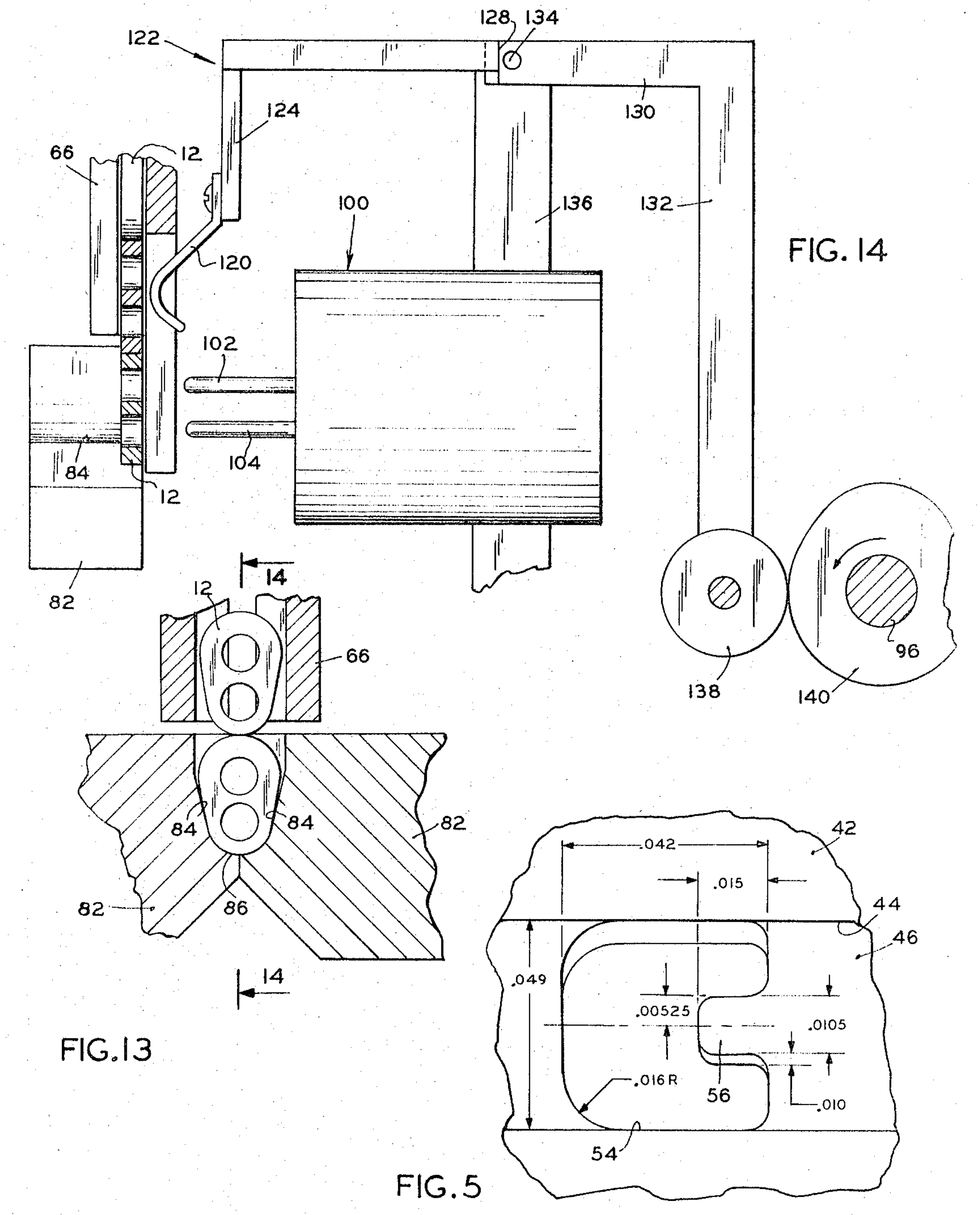
FIGURE 5 is a perspective view illustrating on an enlarged scale the configuration of one of the trap openings via which the improperly oriented cores fall.
FIGURE 13 is a greatly enlarged sectional detail taken in the direction of line 13—13 of FIGURE 12.
FIGURE 14 is a sectional view taken in the direction of line 14—14 of FIGURE 13.

Referring now in detail to the drawings, the core handler that has been selected for rather schematically illustrating the invention has been designated in its entirety by the reference numeral 10. Before describing the core handler 10 in detail, it will be of assistance in appreciating the benefits to be derived from the present invention to refer specifically to an individual core labeled 12 which is shown on an enlarged scale in FIGURE 2. The various core elements 12 are quite small dimensionally. To provide a clearer understanding of the problems involved in the handling and processing of such minute cores, typical dimensions have been applied to the core pictured in FIGURE 2. It will be observed that the core has an over-all length of only 0.065 inch and a width of 0.046. The core 12 has a longitudinal axis 14 and the core is symmetrical to either side of this axis; however, the transverse axis indicated by the reference numeral 16 is nearer one end than the other. Thus, it will be seen that the heavier end portion identified by the reference numeral 18 has a radius of 0.023 inch and the lighter weight end indicated by the reference numeral 20 has a radius of 0.016 inch. The core has two holes 22, 24 extending from its upper face to its lower face. More precisely, the hole 22 can be said to be in the heavier end portion 18 and the hole 24 in the lighter weight end portion 24.

Returning to FIGURE 1 wherein the entire core handler 10 is depicted, it will be observed that the handler 10 comprises a lower casing 26 and an upper casing 28. Mounted on the top of the upper casing 28 is a vibratory conveyor mechanism denoted generally by the reference numeral 30. These mechanisms 30 are widely used at the present moment, being sold under the name of "Syntron," which type of mechanism is fully described in U.S. Patent No. 2,696,292 issued to William V. Spurlin on December 7, 1964. The conveyor mechanism 30 includes a feed bowl 32 having a floor or bottom 34 and a spiral track or raceway 36 curving upwardly from the floor 34.

Figures 1, 3, 4:
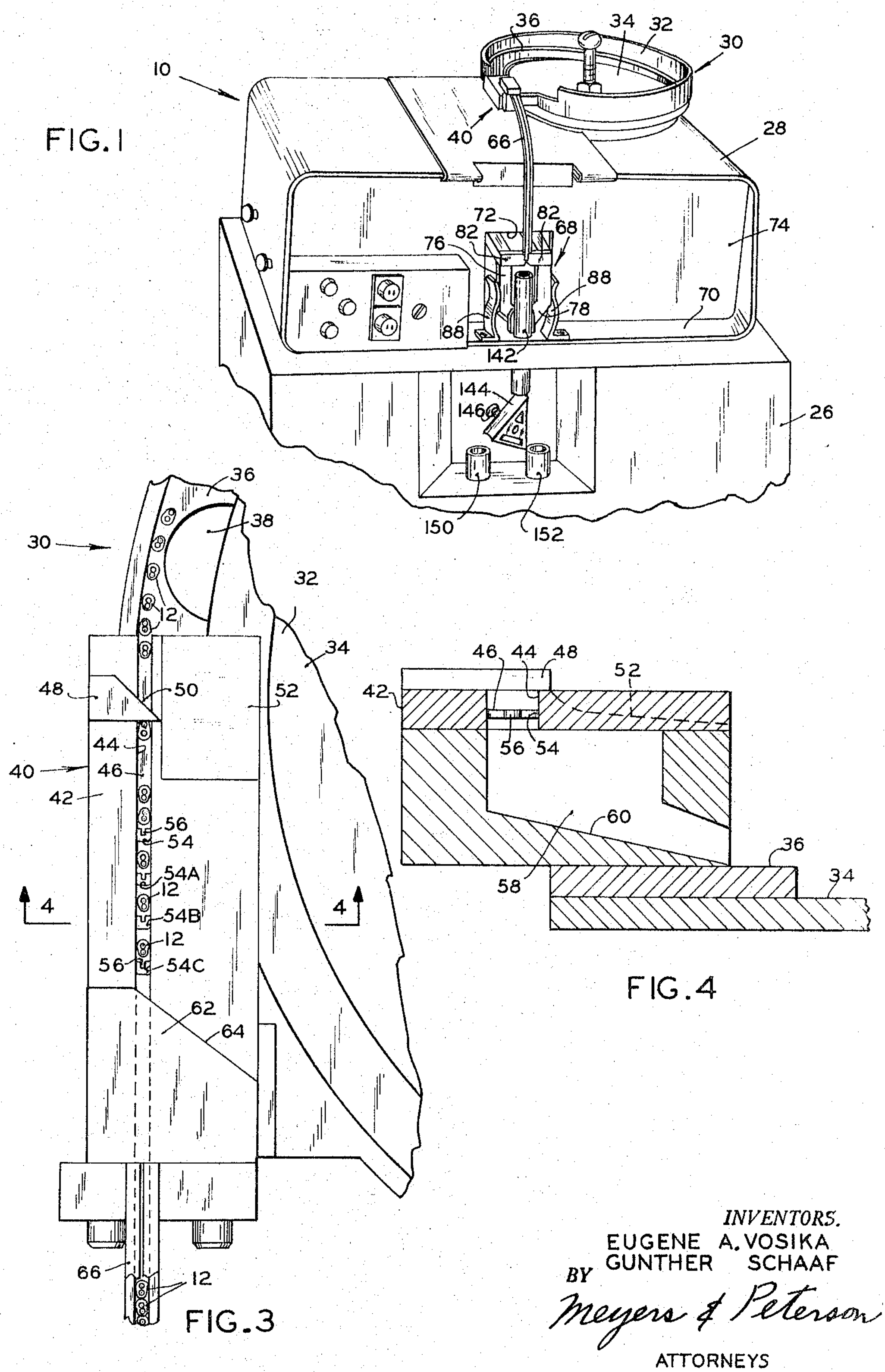
FIGURE 1 is a perspective view of core handling apparatus exemplifying my invention.
FIGURE 3 is a top plan view of the passive orienter assembly with portions of the associated parts also depicted.
FIGURE 4 is a sectional view taken in the direction of line 4—4 of FIGURE 3 for the purpose of showing the position of one trap opening and the route via which the removed core is returned to the feed bowl for another pass over the orienter assembly.

The upper end of the spiral track or raceway 36 is shown in FIGURE 3 and it will be perceived therefrom that there is a scalloped-shape depression 38 sloping toward the feed bowl 32 which returns the cores 10 that are not oriented in an end-to-end relationship with each other. Thus, when the stream of cores 12 reaches the upper end of the raceway 36, it will be in the desired end-to-end relationship that is needed for the further handling thereof.

At this time, attention is directed to what will be termed a passive core orienter assembly 40. This assembly 40, as can be seen from FIGURE 3, includes a generally flat plate 42 having a groove 44 formed therein which extends from one end to the other, the groove having a generally horizontal flat bottom surface at 46. Whereas the cores 12 enter the groove 44 in an end-to-end relationship, some of the cores might be on top of each other in a somewhat "piggy-back" relation. To divert those cores that are riding on the other cores, a deflector 48 having an angled edge 50 overlies the groove 44 near the entrance thereof. When any cores 12 that are carried on top of the cores that are actually traversing the surface 46 engage the edge 50, they are deflected to one side and fall upon a sloping ramp 52 that leads back into the feed bowl 32, this sloping ramp also appearing in dotted outline in FIGURE 4.

Figure 6:
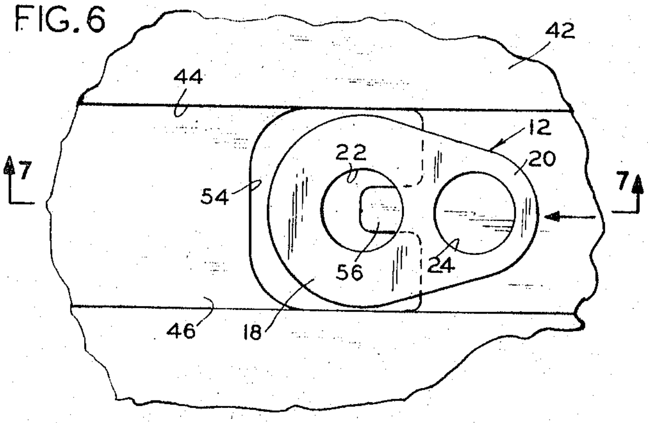
FIGURE 6 is a fragmentary plan view of an improperly oriented core just prior to rocking about the approach edge of the opening for disposal therebeneath.
Figure 8:
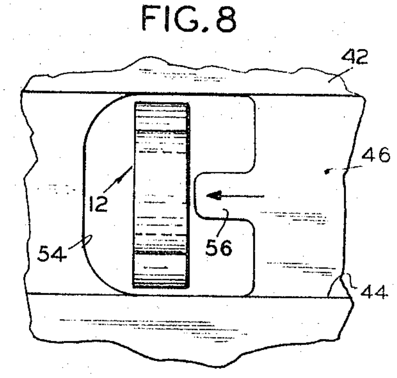
FIGURE 8 is a top plan view corresponding to FIGURE 6 but with the core actually falling through the opening.
Figures 9, 10:
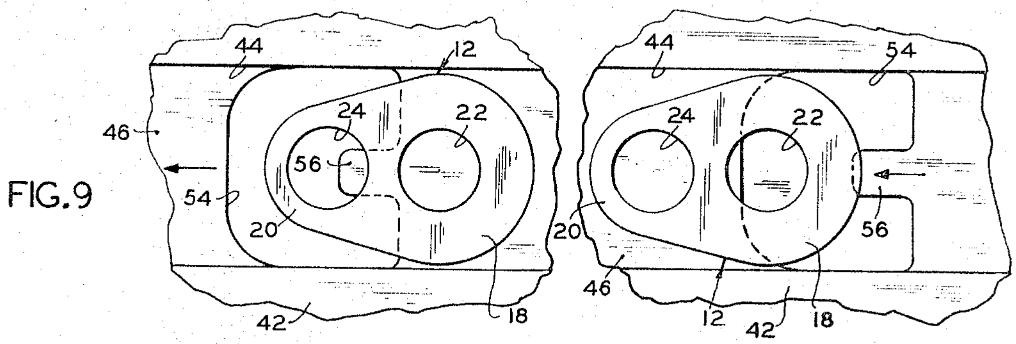
FIGURE 9 is a top plan view corresponding to FIGURE 6 but with a properly oriented core approaching the trap opening.
FIGURE 10 is another view similar to FIGURE 9 but with the properly oriented core passing over the trap opening, the rearmost portion thereof being supported by the tongue that extends in the direction of core travel.
Figure 7:
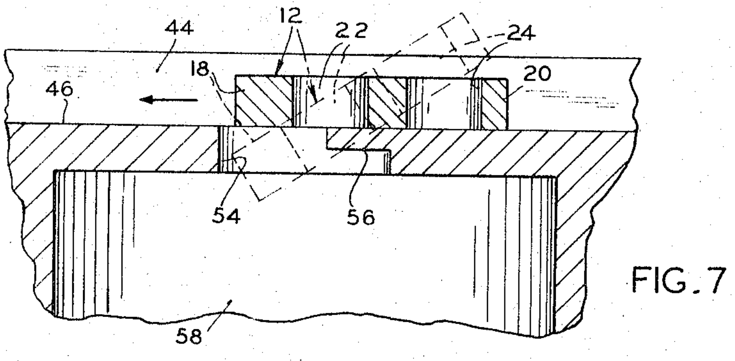
FIGURE 7 is a sectional view taken in the direction of line 7—7 of FIGURE 6, the solid line position of the core corresponding to the position of the core in FIGURE 6 but the phantom outline position of said core illustrating the rocking action that ensues in order to drop the core through the opening.

Of appreciable importance in the realization of the objects of the instant invention is the configuration of a trap opening 54 having a tongue 56 projecting from the approach edge thereof in the direction of movement of the stream of cores 12. Actually, several trap openings are employed, the additional ones being labeled *54a*, *54b* and *54c*. It can be explained that while the first trap opening 54 will be instrumental in removing the improperly oriented cores, it sometimes happens that due to frictional forces or other adhesion between adjacent cores, some cores pass over the first opening 54. However, the probability of any improperly oriented core traversing a total of four openings is indeed remote and is excellent insurance against this undesired condition taking place. Although the action that occurs will be better understood as the description progresses, nonetheless from FIGURE 4 it will be noted that the tongue 56 extending into each opening 54, *54a*, *54b*, *54c* has a lesser width than the diameter of the holes 22, 24 in each of the cores 12. More specifically, the width of the tongue is 0.0105 inch, whereas the diameter of the hole 22 in the heavier end portion 18 is 0.020 inch. Consequently, when the heavier end portion 18 is foremost, the core 12 rocks about the approach edge of the trap opening 54 in the manner sequentially portrayed in FIGURE 7, the solid line position of the core element 12 there shown illustrating the condition just before the rocking takes place and the phantom outline position showing the particular core as it rocks or pivots about the approach edge of the opening 54; FIGURE 6 shows the core 12 in the position it appears in solid outline in FIGURE 7, but FIGURE 8 shows the core 12 as it is gravitationally dropping through the opening 54 into a chamber 58 having a sloping floor 60 (FIGURE 4) leading back to the feed bowl 32. In other words, any core 12 with its heavier end 18 leading is dropped gravitationally through the opening 54 (or at least one of the openings *54a*, *54b*, *54c*) and is returned to the bowl 32 for a further trip which will be completed only if the core is oriented with its lighter weight end portion 20 foremost. The proper or desired orientation of the cores is shown in FIGURES 9 and 10, the tongue 56 supporting the heavier end portion which is trailing in these two views until the major portion of the core has traversed the opening 54, the same passage taking place over the openings *54a*, *54b* and *54c* when the core 12 is so oriented.

From what has been said above, it should be readily apparent that only those cores 12 having their smaller end portions 20 foremost are to continue their trip through the core handler 10. Actually, in FIGURE 3, the individual cores 12 there shown, some of which are properly oriented and some of which are improperly oriented, are spaced from each other for the purpose of exposing to view the four trap openings 54, *54a*, *54b* and *54c*. Ordinarily, the cores 12 will be close together but when so juxtaposed in their end-to-end relationship, the specific openings 54, *54a*, *54b* and *54c* would be concealed.

Those cores that pass by the last opening *54c* are allowed to continue along the groove 44 and pass beneath a scraper element 62 having an angled edge 64 somewhat similar to the previously-mentioned angled edge on the deflector 48. Should there be any pile up of the cores 12 at this point, such cores will merely be diverted back to the feed bowl 32.

However, the cores 12 which are now properly oriented with their lighter weight end portion 20 foremost continue to the inlet of a conveyor chute 66 that curves downwardly to a core locater assembly indicated generally by the reference numeral 68 and which assembly is supported on the bottom wall 70 of the casing 28. An opening 72 is formed in the front wall 74 of the casing 28 so as to allow the parts located forwardly of the front wall 74 to be actuated.

At this time, it would be well to emphasize that the core locater assembly 68 is only schematically portrayed. To depict all of the parts constituting same in the relationship that they occupy in actual practice would unduly complicate the drawings. In other words, although still not simple, an effort is herein being made to facilitate an understanding of what takes place at the core locater assembly 68.

Describing in detail the core locater assembly 68, a pair of locater arms 76, 78 will first be mentioned, these arms being pivoted at their lower ends at 80. The upper ends thereof are inturned and provide opposed jaws or fingers 82. Each jaw or finger is notched at 84 so as to provide a core holding pocket 86 when the adjacent ends of the fingers 82 abut each other. Urging the arms 76, 78 toward each other which results in the abutting of the fingers 82 are leaf springs 88 anchored at their lower ends to the bottom wall 70 of the casing 28. As previously indicated, the assembly 68 now being described is rather diagrammatically presented. Therefore, the rearwardly directed extensions 90 are quite dissimilar from what would be used in actual practice but these extensions 90 do serve the purpose of providing support for a pair of cam followers 92 which confront each side of a cam 94 which is mounted on a cam shaft 96. The motor drive for the shaft 96 is not illustrated but it will be mentioned that the shaft 96 rotates in the direction of the arrow 98. It is the role of the cam 94 to urge the cam followers 92 apart in order to separate the fingers 82 on the upper ends of the locater arms 76, 78; the springs 88 normally bias said fingers toward each other but this biasing action is readily overcome by the cam action, the faces of the cam 94 being such as to cause separation of the fingers at the proper time which proper time is immediately after the magnetic testing operation has taken place.

Inasmuch as the probe assembly 100 is of conventional construction, it will only be stated that the probe assembly 100 carries a pair of conductor probes 102 and 104, the probe 102 being inserted into the hole 24 which is uppermost at the test station provided by the core locater assembly 68. Here again, it is highly desirable to present the means for advancing and retracting the probe assembly 100 in a schematic manner. Accordingly, the probe assembly is mounted on a slidable arm 106 which is freely received in a bearing 108 having a horizontally directed slot 110 extending therethrough. The bearing 108 is fixedly attached to the upper end of a support or standard identified by the reference numeral 112. The slidable arm 106 is bent such that a downwardly extending portion thereof can be used to mount a cam follower 114 thereon. A second cam 116, this being a profile cam, is fixedly carried on the earlier-mentioned cam shaft 96. A leaf spring 118 biases the cam follower 114 against the cam 116. Thus, the probe assembly 100 is advanced by way of spring action to effect insertion of the probes 102, 104 into the holes 24 and 22 of the core 12 when held by the core locater assembly or holding mechanism 68.

Figure 11:
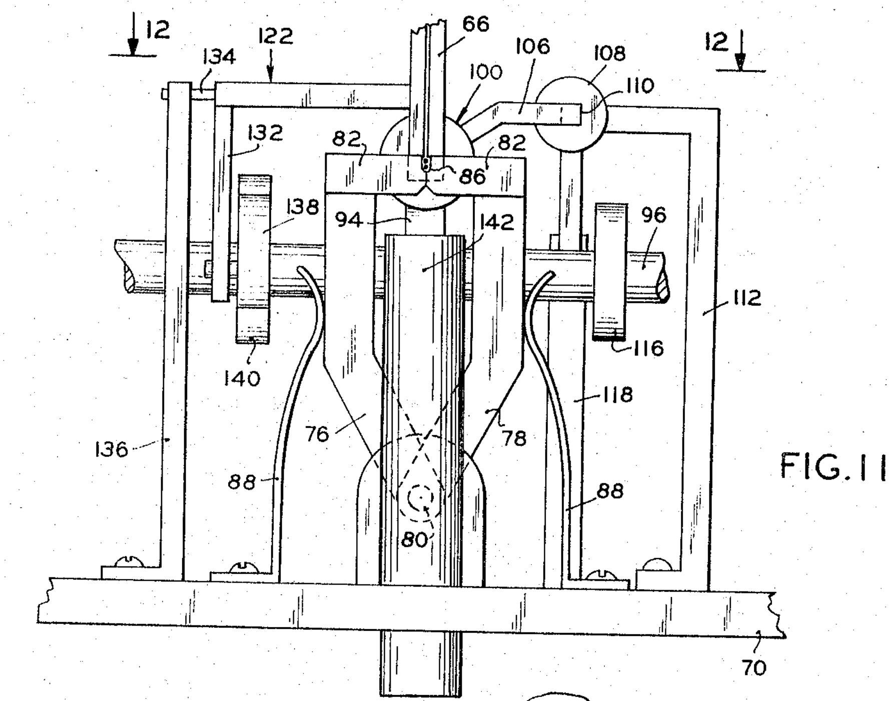
FIGURE 11 is a front elevational view of the core holding mechanism, the casing or housing being removed in order to show the cam shaft and the parts actuated therefrom.
Figure 12:
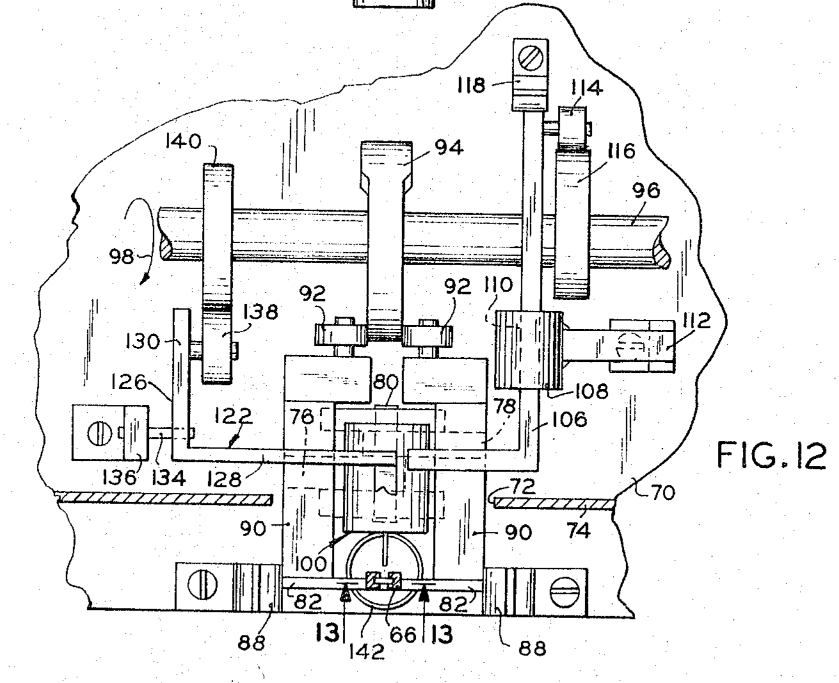
FIGURE 12 is a top plan view of the holding mechanism taken in the direction of line 12—12 of FIGURE 11.

Since the locater arms 76, 78 are spread apart in order to separate the core holding fingers 82 integral therewith at various times, more specifically immediately after each testing operation has been consummated when the probe assembly 100 is withdrawn, a spring finger 120 is employed for the purpose of pressing against the lowermost core 12 until the particular core 12 next above the core that has been tested should be lowered. Obviously, the succeeding cores 12 coming down the conveyor chute 66 cannot be allowed to drop in an uncontrolled manner from the lower end of said chute, for it is essential that the fingers 82 be together in order to form the core holding pocket 86. Therefore, the spring finger 120 is urged against the lowermost core 12 in order to prevent its undesired lowering. The finger 120 is withdrawn at all times when core restriction is not necessary. To accomplish this goal, a rather irregularly shaped, although generally of U-shaped configuration, carrier bar 122 is utilized, Tracing the three-dimensional outline of the carrier bar 122, it will be helpful to apply reference numerals to the various sections constituting such bar. Accordingly, the spring finger 120 is attached directly to a vertical section 124 which is part of the carrier bar 122. There is additionally an L-shaped section that can best be viewed in FIGURE 12 inasmuch as it resides generally in a horizontal plane. The L-shaped section 126 is composed of individual legs 128, 130. The end of the leg 130 has a downwardly extending section 132 connected thereto as can be discerned from FIGURE 11. The carrier bar is mounted for pivotal movement about a horizontal axis, this being supplied by pivot pin 134 extending through the leg 130 and being supported at the upper end of a standard 136 extending upwardly from the bottom wall 70 of the casing 28. Through this arrangement, a cam follower 138 can be attached to the lower end of the vertical section 132 of the carrier bar 122 and this follower engages still another cam 140 mounted on the cam shaft 96. By appropriately contouring the cam 140, the carrier bar 122 can be rocked in a direction so as to cause the spring finger 120 to bear with sufficient pressure against the particular core 12 at the lower end of the column or stream of such cores in preparation for the subsequent dropping of the core into the pocket 86 when formed by having the fingers 82 abut each other.

Although the testing equipment has not been shown, being contained in the lower casing 26, it will be understood that the probe assembly 100 has conductors connecting the probes 102, 104 to such equipment and that an appropriate signal is produced depending upon the results of the test to which the particular core 12 has been subjected.

With the belief that the actual test equipment need not be shown or described further, it can be pointed out that the core 12 that is dropped from the holding fingers 82 when the locater arms 76, 78 are cammed apart will allow the hitherto held core 12 to fall downwardly. The tested core 12 enters the upper end of the vertically disposed tube 142 and then continues downwardly onto a triangularly-shaped deflecting vane 144 (FIGURE 9) mounted on a shaft 146 projecting through the panel 148, the panel being part of the lower casing 26. The angular position of the shaft 146 is dependent upon the signal provided by the test equipment and if the magnetic testing has indicated that the particular core 12 should be accepted, then the deflecting vane 144 remains in the position depicted in FIGURE 1 so that it deflects the core into the "accept" receptacle 150 at the left in FIGURE 1 and if the core is to be rejected, then the vane 14 is rocked slightly in a counterclockwise direction so that the core is shifted into the "reject" receptacle 152. It will be appreciated that the vane 144 has been shown without any encircling casing; also, it will be understood that different types of sorting assemblies can be used, the main criterion being that they operate quickly so as not to slow down the processing of the cores.

While it is virtually impossible for a core 12 to reach the testing station or core locater assembly 68 in an improperly oriented position, nonetheless the curvature imparted to the notches 84 that form the holding pocket 86 when the fingers 82 abut are shaped so that if the larger or heavier end of the core 12 comes down first, then the hole 22 will be at substantially the elevation normally occupied by the hole 24. Stated somewhat differently, whereas with a properly oriented core, both holes 22 and 24 will be in alignment with the probes 102 and 104, when and if an improperly oriented core 12 arrives and is held by the fingers 82, then the upper probe 102 will be inserted into the hole 22 (now lowermost because of the improper orientation of the core 12 under these assumed conditions) and the lower probe 104 will merely pass beneath the core, the pocket 86 allowing such passage to occur. Thus, even if a core that is improperly oriented is successful in negotiating all of the "obstacles" placed in its path, the rather delicate probe assembly 100 still will not be damaged because of the coaction between the core holding mechanism and the manner in which the cores are initially segregated so as to present the cores 12 in the proper position. The worse that can happen, even under these most remote circumstances, is that a core 12 that would pass the magnetic test if both probes 102, 104 were inserted into the holes 24, 22, respectively, will be dropped and shifted into the "reject" receptacle 152.

Consequently, the core handler 10 forming the subject matter of the present invention can operate at a very high rate of speed as far as processing a large number of cores 12 is concerned and can do so without the likelihood of any damage occurring to the parts constituting such handler.

It will, of course, be understood that various changes may be made in the form, details, arrangements and proportions of the parts without departing from the scope of my invention as set forth in the appended claims.

We claim:

1. Apparatus for handling generally flat elongated magnetic cores having opposite faces of the same size and an asymmetrically located center of gravity along their longitudinal axes resulting in one end portion of each core being heavier and wider than its opposite end portion, each core having a hole in its heavier end portion, the apparatus comprising means for advancing such cores in a substantially end-to-end relationship, so that their said longitudinal axes are in successive alignment, means providing a surface over which said cores travel in their said end-to-end relationship having an opening therein of a size to allow said cores to drop therethrough, and means partially closing said opening so that those cores oriented in one direction pass across said opening and those cores oriented in an opposite direction fall through said opening, said last-mentioned means projecting in the direction said aligned axes from one side of said opening toward the other side thereof and terminating in a spaced relation with said other side so that the space therebetween is greater than the distance from the heavier end to the center of gravity of said cores and less than the distance from the opposite end to said center of gravity.

2. Apparatus in accordance with claim 1 including means for successively receiving by gravity each core that has passed said opening and holding such core during the magnetic testing thereof with its heavier and wider end portion uppermost.

3. Apparatus for handling generally flat, elongated magnetic cores having opposite faces of the same size and an asymmetrically located center of gravity along their longitudinal axes resulting in one end portion of each core being heavier and wider than its opposite end portion, each core having a hole in its heavier end portion, the apparatus comprising means for advancing such cores in a substantially end-to-end relationship so that their said longitudinal axes are in successive alignment, means providing a surface over which said cores travel in their said end-to-end relationship having an opening therein of a size to allow said cores to drop therethrough, and a tongue element projecting from the approach edge of said opening in the direction of advancement of said cores and of a width less than the width of the holes in said heavier end portions and terminating at a locus spaced from the edge of said opening opposite said approach edge by an amount greater than the distance from the heavier end to the center of gravity of said cores and less than the distance from the opposite end to said center of gravity, whereby those cores with their heavier end portions oriented forwardly fall through said opening and those cores with their heavier end portions oriented rearwardly pass over said opening.

4. Apparatus for handling generally flat, elongated magnetic cores having opposite faces of the same size and an asymmetrically located center of gravity along their longitudinal axes resulting in one end portion of each core being heavier and wider than its opposite end portion, each core having a hole in its heavier end portion, the apparatus comprising means for advancing such cores in a substantially end-to-end relationship so that their said longitudinal axes are in successive alignment, means providing a surface over which said cores travel in their said end-to-end relationship having an opening therein of a size to allow said cores to drop therethrough, and a tongue element projecting from one edge of said opening in a direction generally parallel to the advancement path taken by said cores and of a width less than the holes in said heavier end portions and terminating at a locus spaced from the edge of said opening opposite said approach edge by an amount greater than the distance from the heavier end to the center of gravity of said cores and less than the distance from the opposite end to said center of gravity, whereby those cores with their heavier end portions oriented in the direction said tongue element extends will fall through said opening.

5. Apparatus in accordance with claim 4 in which said surface means is provided with at least one additional opening in the path of said cores, said additional opening also having a tongue element similar to said first-mentioned tongue element, whereby the chances of any core passing beyond said openings with its heavier end portion oriented forwardly is minimized.

6. Apparatus in accordance with claim 4 including a pair of separable members forming a core-receiving pocket when in abutting relation, said pocket having upwardly diverging sides corresponding generally to the shape of said opposite end portion of said cores, whereby those cores that have passed said opening will be held properly for testing purposes.

7. Apparatus in accordance with claim 6 including a curved chute for conveying the cores with their said opposite ends foremost that have passed said opening downwardly for vertical delivery to said separable members, and means actuatable when said separable members are apart to prevent the gravitational discharge of cores above the core just released by said separable member.

8. Apparatus for handling generally flat, elongated magnetic cores having opposite faces of the same size and an asymmetrically located center of gravity along their longitudinal axes resulting in one end portion of each core being heavier than its opposite end portion, each core having a hole in its heavier end portion and a hole in its lighter end portion, the apparatus comprising means for advancing said cores in a substantially end-to-end relationship so that their axes are in successive alignment, means providing a surface over which said cores travel in their end-to-end relationship having an opening therein of a size to allow said cores to drop therethrough, a tongue element projecting from one edge of said opening toward the other side thereof in a direction generally parallel to the advancement path taken by said cores but terminating in a spaced relation with the other side to partially close said opening so that the space between said tongue element and said other side is greater than the distance from the heavier end to the center of gravity of said cores and less than the distance from the opposite end to said center of gravity, said tongue element having a width less than the width of the holes in said heavier end portions, whereby those cores with their heavier end portions oriented in the direction said tongue element extends will fall through said opening.

References Cited by the Examiner

UNITED STATES PATENTS

| | | | |
|---|---|---|---|
| 2,701,637 | 2/1955 | Rundt | 193—43 |
| 2,915,165 | 12/1959 | Bell | 193—43 |
| 3,111,231 | 11/1963 | Baer | 198—33.4 |

FOREIGN PATENTS

| | | |
|---|---|---|
| 16,848 | 11/1915 | Great Britain. |

ANDRES H. NIELSEN, *Primary Examiner.*